United States Patent
Kalogiros et al.

(10) Patent No.: US 12,399,249 B2
(45) Date of Patent: Aug. 26, 2025

(54) METHOD FOR CALIBRATING AN ANCHOR POINT AND DEVICE FOR A POSITIONING SYSTEM

(71) Applicant: u-blox AG, Thalwil (CH)

(72) Inventors: Dimitris Kalogiros, Thalwil (CH); Ioannis Sarris, Thalwil (CH); Matthias Mahlig, Thalwil (CH); Peter Karlsson, Thalwil (CH)

(73) Assignee: u-blox AG, Thalwil (CH)

( * ) Notice: Subject to any disclaimer, the term of this patent is extended or adjusted under 35 U.S.C. 154(b) by 438 days.

(21) Appl. No.: 18/079,260

(22) Filed: Dec. 12, 2022

(65) Prior Publication Data

US 2023/0184872 A1 Jun. 15, 2023
US 2023/0350000 A9 Nov. 2, 2023

(30) Foreign Application Priority Data

Dec. 14, 2021 (EP) .................................. 21214280

(51) Int. Cl.
*G01S 5/02* (2010.01)
*H04W 64/00* (2009.01)

(52) U.S. Cl.
CPC .......... *G01S 5/021* (2013.01); *H04W 64/003* (2013.01)

(58) Field of Classification Search
CPC .............................. G01S 5/021; H04W 64/003
See application file for complete search history.

(56) References Cited

U.S. PATENT DOCUMENTS

2016/0091341 A1 3/2016 Fleureau et al.
2019/0281573 A1 9/2019 Tyagi et al.

FOREIGN PATENT DOCUMENTS

WO WO 2020083468 4/2020

OTHER PUBLICATIONS

Extended Search Report in European Appln. No. 21214280.6, dated Jun. 23, 2022, 6 pages.

*Primary Examiner* — Justin Y Lee
(74) *Attorney, Agent, or Firm* — Fish & Richardson P.C.

(57) ABSTRACT

Calibrating an anchor point in a positioning system includes, in an example implementation, transmitting a localization signal between a mobile device and the anchor point, determining a first direction between the mobile device and the anchor point in a local coordinate system based on the transmitted localization signal, and determining a second direction between the mobile device and the anchor point in a global coordinate system based on the determined first direction and a stored anchor orientation of the anchor point, the anchor orientation defining the local coordinate system of the anchor point with respect to the global coordinate system. Calibrating the anchor point further includes acquiring a target position of the mobile device, the target position being associated with the transmitted localization signal, determining a third direction between the mobile device and the anchor point in the global coordinate system based on a known anchor position and the target position, and adjusting the stored anchor orientation based on the first direction and a difference between the second and the third direction.

16 Claims, 7 Drawing Sheets

METHOD FOR CALIBRATING AN ANCHOR POINT AND DEVICE FOR A POSITIONING SYSTEM

CROSS-REFERENCE TO RELATED APPLICATIONS

This application claims the benefit of priority to European Application No. 21214280.6, filed on Dec. 14, 2021, the contents of which are hereby incorporated by reference.

TECHNICAL FIELD

This disclosure relates to a method for calibrating an anchor point in a positioning system, to a device for a positioning system and to a calibration system with such a device. The disclosure further relates to a computer program product and a computer readable storage medium.

BACKGROUND ART

In many applications like indoor positioning systems, IPS, or real-time location services, RTLS, one key element is to determine a position of a mobile device like a tag based on position information relative to multiple anchor points. Such determination is for example performed in a positioning engine using various mathematical models.

In conventional approaches, an accuracy of the determined position of the mobile device depends on the accuracy of the relative position information of each anchor point. This includes good knowledge not only of the position of each anchor point but also of their orientation relative to a given coordinate system. Conventionally, when installing an anchor point, a specific orientation is chosen manually or mechanically or the orientation after installation is measured and manually input into the positioning system as a basis for the mathematical models.

SUMMARY OF INVENTION

An object to be achieved is to provide an improved calibration concept that allows an easier calibration of an orientation of an anchor point.

This object is achieved with the subject-matter of the independent claims. Embodiments and developments derive from the dependent claims.

According to the present disclosure, a localization signal is transmitted between a mobile device and an anchor point, which may be a stationary device. A first direction is determined between the mobile device and the anchor point in a local coordinate system based on the transmitted localization signal. For transforming said first direction into a global coordinate system, a second direction is determined between the mobile device and the anchor point in the global coordinate system based on the determined first direction and a stored anchor orientation of the anchor point. This anchor orientation defines the local coordinate system of the anchor point with respect to the global coordinate system. For example, the anchor orientation defines a rotation of the local coordinate system within the global coordinate system around the three spatial axes.

The improved calibration concept is based on the idea that instead of manually and/or mechanically measuring the physical orientation of an anchor point in a positioning system with high precision, the stored anchor orientation is updated based on a deviation between an estimated direction between the anchor point and the mobile device, e.g. the above mentioned second direction, and a reference direction between the anchor point and the mobile device. To this end a ground truth position or a position estimated otherwise of the mobile device is made available for determining the reference direction. The deviation is then a measure of how the anchor orientation needs to be updated.

This process can be performed iteratively, e.g. for repeatedly adjusting the anchor orientation.

In an embodiment of a method for calibrating an anchor point in a positioning system according to the improved calibration concept, further to determining the first direction and the second direction, a target position of the mobile device is acquired, e.g. received. For example, this target position corresponds to the mentioned ground truth position or a position determined otherwise. The target position is associated with the transmitted localization signal, e.g. such that for each localization signal being the basis for determining the first direction, a corresponding target position is available.

According to the improved calibration concept the method further comprises determining a third direction between the mobile device and the anchor point in the global coordinate system based on a known anchor position and the target position. The stored anchor orientation is adjusted based on the first direction and the difference between the second and the third direction. Hence with the target position, e.g. determined automatically, the improved calibration concept allows an automatic update of the anchor orientation towards an actual orientation of the anchor point with respect to the global coordinate system. The actual orientation particularly represents the physical orientation of the anchor point.

For example, if the method is performed iteratively, a rough estimation of the anchor orientation can be used as a starting point and the stored anchor orientation is adjusted in the following to the actual orientation.

In another example, the physical orientation of the anchor point may change due to mechanical changes to the anchor point, e.g. through cleaning personnel or maintenance alterations or other demands for slightly moving an anchor point. Also in such cases the changed orientation can be adjusted with the improved calibration concept.

The anchor orientation, for example is based on an orientation of an antenna array of the anchor point with respect to the global coordinate system. For example, such an antenna array comprises two or more linear arrays that usually form a plane in space. That plane, respectively the physical orientation of the plane, may define the anchor orientation in the global coordinate system.

If the adjustment of the stored anchor orientation is performed iteratively, the mobile device may be moved between iterated acquisitions respectively receptions of the respective associated target positions. Hence the adjustment is based on different actual locations of the mobile device. For example, this supports avoiding multipath effects. Furthermore, the adjustment process can be made more statistically independent. For example, an actual adjustment of the anchor orientation may be made dependent on a minimum change criterion for the different actual positions of the mobile device.

The first, the second and the third direction for example are determined as directional vectors, e.g. unit directional vectors.

The anchor orientation may be expressed as and/or stored as a rotation matrix, which mathematically performs a rotation of a local directional vector corresponding to the first direction in order to achieve a global directional vector corresponding to the second direction. In other words, the rotation matrix may be used to perform a transformation between the local coordinate system and the global coordinate system. For example, if for an initial anchor orientation a rotation angle and (down-)tilt of the anchor point with respect to the global coordinate system are available, e.g. through measurement, the rotation matrix may be derived from these angles. The third direction may be determined as a differential vector between the known anchor position and the received target position.

The adjustment of the stored anchor orientation may be performed with a steepest decent algorithm, e.g. a least mean squares, LMS, algorithm, employing a convergence factor. For avoiding instabilities or other deteriorating effects, a small adaptation gain or convergence factor may be chosen such that the adjustment, respectively adaptation, is performed slowly while, on the other hand, employing a large number of measurements and target positions.

In some implementations the mobile device may be mounted to a movable carrier device. In this case the carrier device determines a position of the mobile device within the global coordinate system and provides the determined position as the target position. In particular, the determination of the position of the mobile device by the carrier device is independent of the localization signal transmitted between the mobile device and the anchor point. For example, the carrier device includes its own localization engine, e.g. based on a simultaneous localization and mapping, SLAM, algorithm or a similar approach. For example, the carrier device may be a robotic device, e.g. an autonomous robotic device like a vacuum cleaner robot or the like. The mobile device may be mounted on a specific position on the carrier device, e.g. on a pole at a specific height above ground. Hence, the carrier device knowing or being able to estimate its own position, can transmit this position or the actual target position based on this information. It should be apparent to the skilled reader that there are various ways to determine the target position if the position of the carrier device is available during transmission of the localization signal, e.g. based on a known relative position between the carrier device and the mounted mobile device. The improved calibration concept is based on the usage of such a determined target position.

In other implementations the target position is determined employing at least two further anchor points by transmitting the localization signal and/or respective further localization signals between the mobile device and the at least two further anchor points. For example, conventional determination of the target position is performed in the positioning system based on the information from the anchor point and the at least two further anchor points, e.g. in a positioning engine.

The method according to the improved calibration concept can be performed on the anchor point itself in full, or distributed on the anchor point and a positioning engine. In the latter case the anchor point may be concerned with the transmission of the localization signal and the determination of the first direction and may provide said first direction to the positioning engine for further processing and performing of the remaining method steps. However, the anchor point may also perform the determination of the second direction and provides the second direction to the positioning engine, which in turn provides back the adjusted anchor orientation. Other distributions should not be excluded by the given examples.

The positioning engine may be a local positioning engine being located in the same area respectively the same local network as the anchor points or even being part of one of the anchor points. However, the positioning engine may also be implemented as a service component in a network cloud, e.g. over the internet.

According to the improved calibration concept, a device for a positioning system comprises a memory, a communication unit and a processing unit. The memory is configured to store a known anchor position of an anchor point for the positioning system within a global coordinate system, and to store an anchor orientation of the anchor point. The anchor orientation defines a local coordinate system of the anchor point with respect to the global coordinate system, e.g. as described above in conjunction with implementations of the method according to the improved calibration concept. The communication unit is configured to receive a localization information that is based on a localization signal transmitted between a mobile device and the anchor point, and to acquire a target position of the mobile device, the target position being associated with the transmitted localization signal.

The processing unit is configured to acquire or determine a first direction between the mobile device and the anchor point in the local coordinate system based on the received localization information. Furthermore, the processing unit is configured to acquire or determine a second direction between the mobile device and the anchor point in the global coordinate system based on the determined first direction and the anchor orientation. The processing unit is further configured to determine a third direction between the mobile device and the anchor point in the global coordinate system based on the anchor position and the target position, and to adjust the stored anchor orientation based on the first direction and the difference between the second and the third direction.

The processing unit may be configured to determine respectively acquire the first, the second and the third direction as directional vectors, e.g. unit directional vectors.

The device may be configured to iteratively receive the localization information and to acquire the associated target position and to adjust the anchor orientation based thereon.

In some implementations the device is configured to be operated in a calibration mode of operation, during which the processing unit adjusts the anchor orientation, and in a normal mode of operation, during which the communication unit receives the localization information and the processing unit determines the first and the second direction.

In some implementations the device is the anchor point, which may be a stationary device. In this case the localization information is one of the localization signal received from the mobile device or a direction information determined by the mobile device based on the localization signal received from the anchor point.

If the localization information is the localization signal, this may correspond to a situation where the anchor point determines an angle of arrival, AoA, based on the localization signal, which e.g. is reflected in the determination of the first direction and consequently the second direction. If the localization information is a direction information, this may correspond to the case where the mobile device determines an angle of departure, AoD, based on the localization signal received from the anchor point.

In an alternative implementation, the device is a positioning engine of the positioning system. In this case the localization information is a direction information determined by the mobile device or by the anchor point based on the localization signal transmitted between the mobile device and the anchor point. In this case the acquisition of the first direction may reduce to using the localization information as the first direction, i.e. the localization information already comprises or consists of the first direction.

However, in some implementations, the device being the positioning engine may also leave out the step of the acquisition of the first direction and use the direction information received as the localization information directly as the second direction, e.g. if the anchor orientation is known to the device providing the localization information. For example, the localization information comprises the second direction. In this case the adjusted anchor orientation may be provided to the mobile device, respectively the anchor point providing the localization information.

In a further aspect, a calibration system for a positioning system according to the improved calibration concept comprises a movable carrier device, a mobile device mounted to the carrier device and one of a) a device as described above as an anchor point or b) a device as described above being a positioning engine as well as an anchor point. In both cases the carrier device is configured to determine a position of the mobile device within the global coordinate system and to provide the determined position to the device as the target position.

Further implementations of the device, respectively the calibration system, become readily apparent for the skilled reader from the various implementations described above in conjunction with the method for calibrating an anchor point.

According to one embodiment of the improved calibration concept, a computer program product for calibrating an anchor point in a positioning system comprises instructions that may be stored in a preferably non-transitory computer-readable storage medium, the instructions enabling a computer system with one or more processors to execute a method according to one of the implementations described above. The computer system may be implemented within a positioning engine and/or an anchor point and may be distributed.

Furthermore, a computer system may have one or more processors and a storage medium having computer program instructions stored therein, enabling the one or more processors to execute a method according to one of the implementations described above.

BRIEF DESCRIPTION OF DRAWINGS

The improved calibration concept will be explained in more detail in the following with the aid of the drawings. Elements and functional blocks having the same or similar function bear the same reference numerals throughout the drawings. Hence their description is not necessarily repeated in following drawings.

In the drawings.

DETAILED DESCRIPTION

Figure 1:
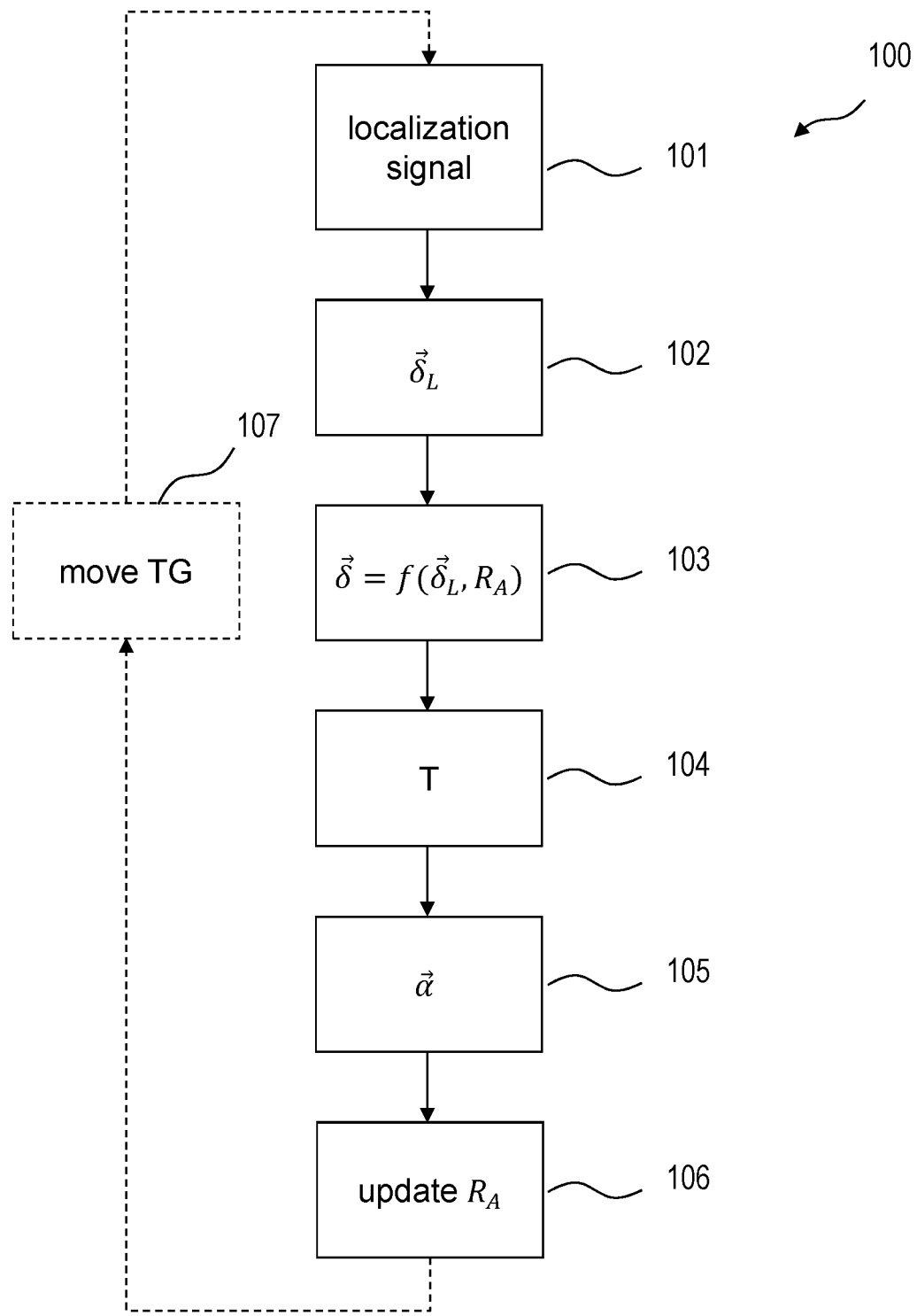
FIG. 1 shows a flowchart of a method for calibrating an anchor point in a positioning system.

FIG. 1 shows a flow diagram of an example implementation of a method 100 for calibrating an anchor point in a positioning system.

Step 101 includes transmitting a localization signal between a mobile device and the anchor point. The anchor point may be a stationary device. The mobile device can be a tag that transmits or receives the localization signal as a radio frequency, RF, signal, like a Bluetooth direction finding signal, which includes a constant tone extension packet, CTE. Other RF signals like Wi-Fi signals, Ultra-wideband, UWB, or cellular signals could be used as an alternative, for example.

Figure 2:
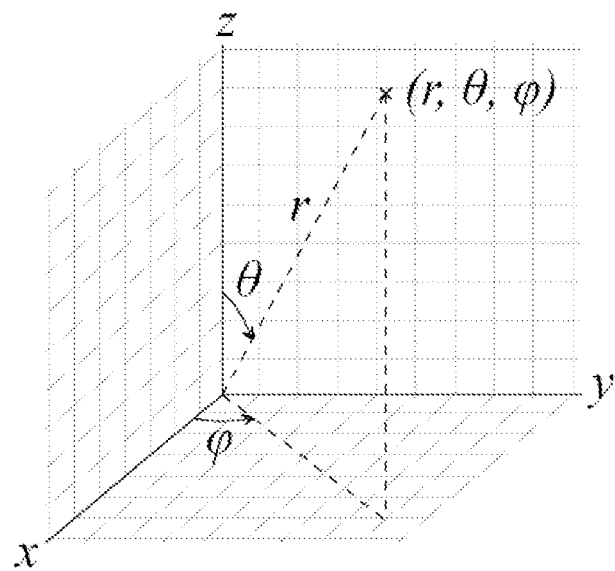
FIG. 2 shows an example vector with a spherical coordinates definition.

Referring now to FIG. 2, a definition of spherical coordinates is shown that is going to be used in this disclosure.

In mathematics, a spherical coordinate system is a coordinate system for three-dimensional space where the position of a point is specified by three numbers: the radial distance r of that point from a fixed origin, its polar angle θ measured from a fixed zenith direction, and the azimuthal angle φ of its orthogonal projection on a reference plane that passes through the origin and is orthogonal to the zenith, measured from a fixed reference direction on that plane.

The spherical coordinates vary at the following range:

$$r \geq 0$$

$$0 \leq \theta \leq \pi$$

$$0 \leq \varphi < 2\pi \text{ or } -\pi < \varphi \leq \pi \quad (1)$$

The transformation between spherical and Cartesian coordinates is given by the following formulas:

$$r = \sqrt{x^2 + y^2 + z^2} \quad (2)$$

$$\theta = \cos^{-1}\left(\frac{z}{\sqrt{x^2 + y^2 + z^2}}\right) = \tan^{-1}\left(\frac{\sqrt{x^2 + y^2}}{z}\right)$$

$$\varphi = \tan^{-1}\left(\frac{y}{x}\right)$$

$$x = r \cos \varphi \sin \theta \quad (3)$$

$$y = r \sin \varphi \sin \theta$$

$$z = r \cos \theta$$

Referring back to FIG. 1, step 102 includes acquiring or determining a first direction between the mobile device and the anchor point in a local coordinate system based on the transmitted localization signal. For example, referring to FIG. 3, the anchor point ANC, which is located at the origin of its local coordinate system at the position $A(x_A, y_A, z_A)$, determines the two angles φ and θ with respect to the mobile device TG at the position $T(x_T, y_T, z_T)$. From the angles φ and θ the first direction can be determined, e.g. as a directional vector.

Assuming that the anchor point ANC can be rotated with respect to the global coordinate system, an anchor orientation of the anchor point ANC may be stored that defines the local coordinate system of the anchor point ANC with respect to the global coordinate system. Accordingly, in step 103 a second direction between the mobile device TG and the anchor point ANC is acquired or determined in a global coordinate system based on the first direction acquired or determined before and on the stored anchor orientation.

Furthermore, in step 104 the target position of the mobile device TG, e.g. at the coordinates $T(x_T, y_T, z_T)$ is received, wherein this target position is associated with the transmitted localization signal. In particular, the target position received should correspond to the localization signal that is transmitted between the mobile device TG and the anchor point ANC while the mobile device TG is at the target position.

Assuming that the coordinates $(x_A, y_A, z_A)$ of the anchor point ANC and $(x_T, y_T, z_T)$ of the mobile device TG are defined in a global coordinate system, from the perspective of this global coordinate system, the direction from the anchor towards the target is defined by the vector:

$$\overrightarrow{AT} = \begin{bmatrix} x_T - x_A \\ y_T - y_A \\ z_T - z_A \end{bmatrix} \quad (4)$$

Figure 3:
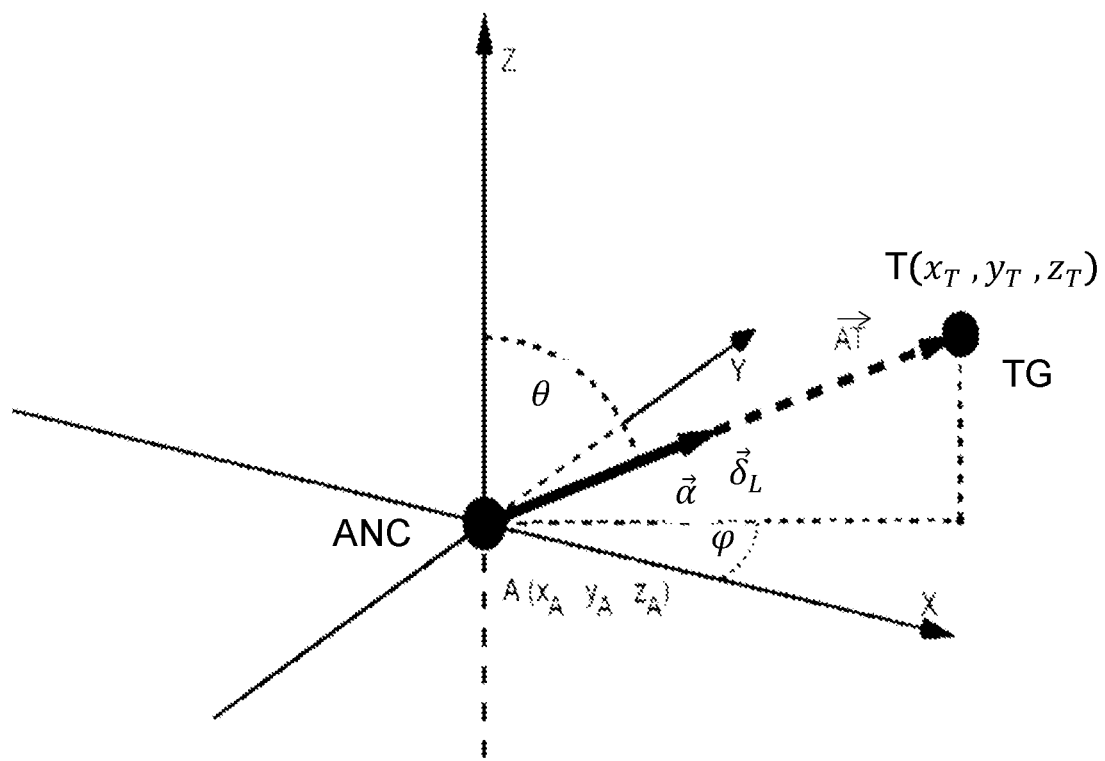
FIG. 3 shows an example 3D view of an anchor point and a mobile device.
Figure 4:
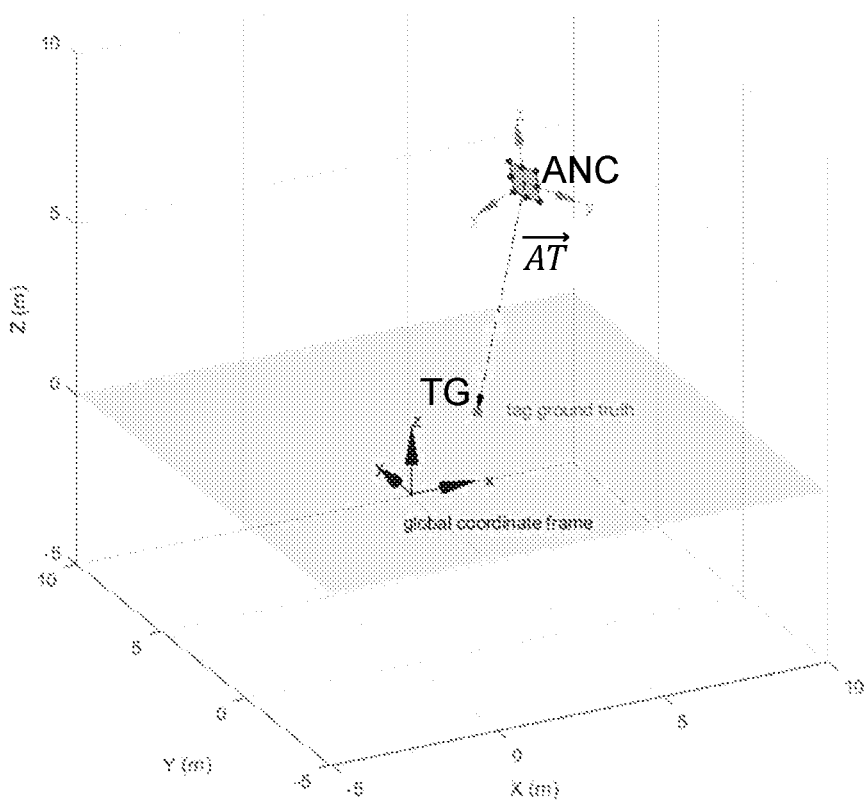
FIG. 4 shows an example 3D view of an anchor point having an orientation in a global coordinate system.

This vector $\overrightarrow{AT}$ is depicted in FIG. 3 and FIG. 4 and is determined in step 105 of FIG. 1 as a third direction. FIG. 4 shows an example of the orientation of the anchor point ANC within the global coordinate system.

From the perspective of the anchor's ANC local coordinate system the direction from the anchor ANC towards the mobile device TG is defined by the unit directional vector $\vec{\delta}_L$ corresponding to the first direction:

$$\vec{\delta}_L = \begin{bmatrix} \delta_{Lx} \\ \delta_{Ly} \\ \delta_{Lz} \end{bmatrix} = \begin{bmatrix} \cos\varphi \cdot \sin\theta \\ \sin\varphi \cdot \sin\theta \\ \cos\theta \end{bmatrix} \quad (5)$$

These two vectors $\overrightarrow{AT}$ and $\vec{\delta}_L$, as mathematical objects, need to be parallel. But before we exploit their parallelism, we must express the vector $\vec{\delta}_L$ in its equivalent form with respect to the global coordinate system. To achieve such a goal we use the Euler's angles and the corresponding rotation matrix $$R_A = \begin{bmatrix} r_{11} & r_{12} & r_{13} \\ r_{21} & r_{22} & r_{23} \\ r_{31} & r_{32} & r_{33} \end{bmatrix} \quad (6)$$

The exact calculations needed for the generation of the rotation matrix of the anchor point ANC will be explained in more detail below.

Using the rotation matrix, we express the vector $\vec{\delta}_L$ to its equivalent $\vec{\delta}$ in the global coordinate system:

$$\vec{\delta} = R_A \cdot \vec{\delta}_L = \begin{bmatrix} r_{11} & r_{12} & r_{13} \\ r_{21} & r_{22} & r_{23} \\ r_{31} & r_{32} & r_{33} \end{bmatrix} \begin{bmatrix} \delta_{Lx} \\ \delta_{Ly} \\ \delta_{Lz} \end{bmatrix} \quad (7)$$

$$= \begin{bmatrix} r_{11} & r_{12} & r_{13} \\ r_{21} & r_{22} & r_{23} \\ r_{31} & r_{32} & r_{33} \end{bmatrix} \begin{bmatrix} \cos\varphi \cdot \sin\theta \\ \sin\varphi \cdot \sin\theta \\ \cos\theta \end{bmatrix} = \begin{bmatrix} \delta_x \\ \delta_y \\ \delta_z \end{bmatrix}$$

The unit directional vector $\vec{\delta}$ corresponds to the second direction and is expressed in terms of the global coordinate system. The unit directional vector needs to be parallel with the vector $\overrightarrow{AT}$. Hence, we get the equation of a straight line that is determined by the anchor point ANC and the mobile device TG:

$$\boxed{\overrightarrow{AT} \| \vec{\delta}} \quad (8)$$

$$\Rightarrow \begin{cases} \dfrac{x_T - x_A}{y_T - y_A} = \dfrac{\delta_x}{\delta_y} \\ \dfrac{y_T - y_A}{z_T - z_A} = \dfrac{\delta_y}{\delta_z} \end{cases} \Rightarrow \boxed{\begin{cases} \delta_y x_T - \delta_x y_T = \delta_y x_A - \delta_x y_A \\ \delta_z y_T - \delta_y z_T = \delta_z y_A - \delta_y z_A \end{cases}}$$

Figure 5:
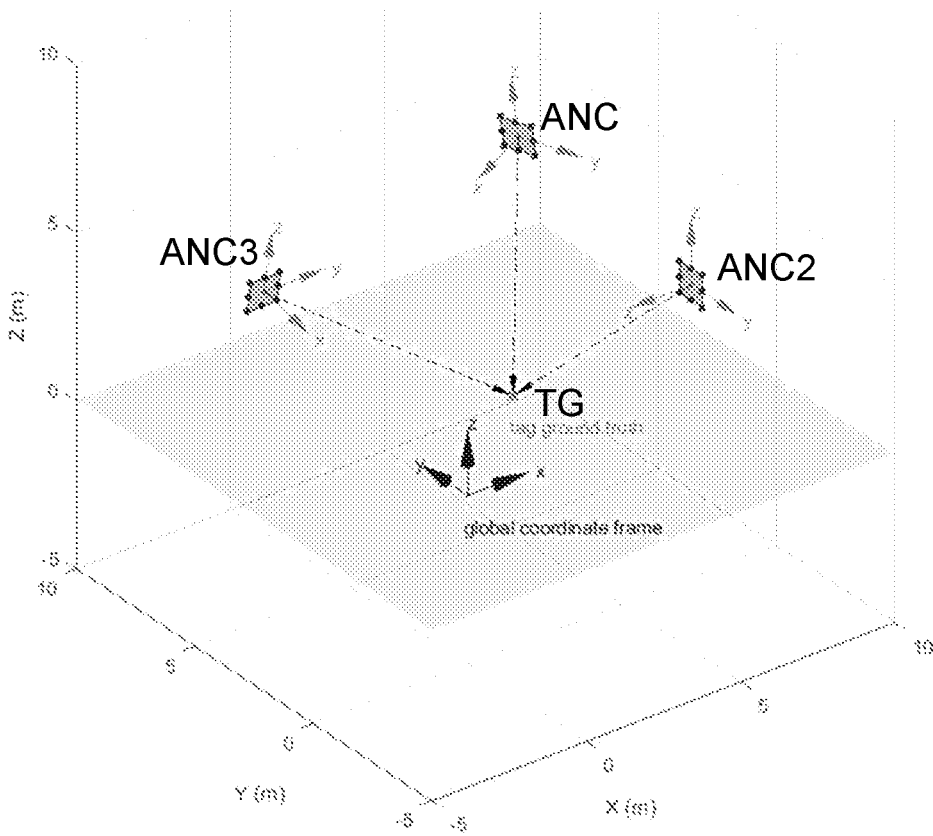
FIG. 5 shows an example 3D view of several anchor points having an orientation in a global coordinate system.

FIG. 5 shows an example 3D view of several anchor points ANC, ANC2, ANC3 having an orientation in a global coordinate system, together with a mobile device TG.

The above equation (8) is the building block of the algorithm which combines more than one anchors that provide angular information and allow us to determine the position of the mobile device TG. Namely, let us suppose that we have a room with N anchors. For example the room depicted in Error Reference source not found. where N=3.

Using equation (8) for each one of the anchors, we create the following matrix equation using the following notation:

Unknown mobile device's position:

$$X = \begin{bmatrix} x \\ y \\ z \end{bmatrix}$$

Position of each anchor with index i:

$$A_i(x_i, y_i, z_i), 1 \leq i \leq N$$

Unit directional vector of each anchor, calculated in terms of the global coordinate system:

$$\vec{\delta}_i = \begin{bmatrix} \delta_{ix} \\ \delta_{iy} \\ \delta_{iz} \end{bmatrix}$$

Combination of all pieces of AoA/AoD information of all anchors in one matrix equation:

$$\overbrace{\begin{bmatrix} \delta_{1y} & -\delta_{1x} & 0 \\ 0 & \delta_{1z} & -\delta_{1y} \\ \delta_{2y} & -\delta_{2x} & 0 \\ 0 & \delta_{2z} & -\delta_{2y} \\ \vdots & \vdots & \vdots \\ \delta_{iy} & -\delta_{ix} & 0 \\ 0 & \delta_{iz} & -\delta_{iy} \\ \vdots & \vdots & \vdots \\ \delta_{Ny} & -\delta_{Nx} & 0 \\ 0 & \delta_{Nz} & -\delta_{Ny} \end{bmatrix}}^{H} \cdot \begin{bmatrix} x \\ y \\ z \end{bmatrix} = \overbrace{\begin{bmatrix} \delta_{1y} x_1 - \delta_{1x} y_1 \\ \delta_{1z} y_1 - \delta_{1y} z_1 \\ \delta_{2y} x_2 - \delta_{2x} y_2 \\ \delta_{2z} y_2 - \delta_{2y} z_2 \\ \vdots \\ \delta_{iy} x_i - \delta_{ix} y_i \\ \delta_{iz} y_i - \delta_{iy} z_i \\ \vdots \\ \delta_{Ny} x_N - \delta_{Nx} y_N \\ \delta_{Nz} y_N - \delta_{Ny} z_N \end{bmatrix}}^{B} \quad (9)$$

We solve equation (9) for X, using the Moore-Penrose inverse and we get the least square (LS) estimation $\hat{X}$ of the mobile device's TG position:

$$\boxed{HX = B} \Rightarrow \hat{X} = \left[(H^T H)^{-1} H^T\right] B \qquad (10)$$

The above analysis is also valid in the case where the mobile device TG measures the AoD with respect to the anchor and the anchor' points local coordinate system. The only difference is that the vector $\vec{\delta}_L$ is being calculated by the mobile device TG.

The positioning engine approach given by equation (9) is just a case study. In general, an anchor point that measures AoA or helps a mobile device to measure AoD, can be part of a more generic localization system which combines more types of measurements. In such a case, regardless the type of information provided by the other anchors or sensors, an anchor that provides AoA/AoD has to conduct the transformation described by equation (7).

Calculation of the Rotation Matrix

Suppose we have an anchor point ANC in the space with its local coordinate system whose origin has been placed at the point $(x_a, y_a, z_a)$. Moreover, the axes of the anchor point's local coordinate system are parallel to the corresponding axes of the global coordinate system, as shown in FIG. 6.

Figure 6:
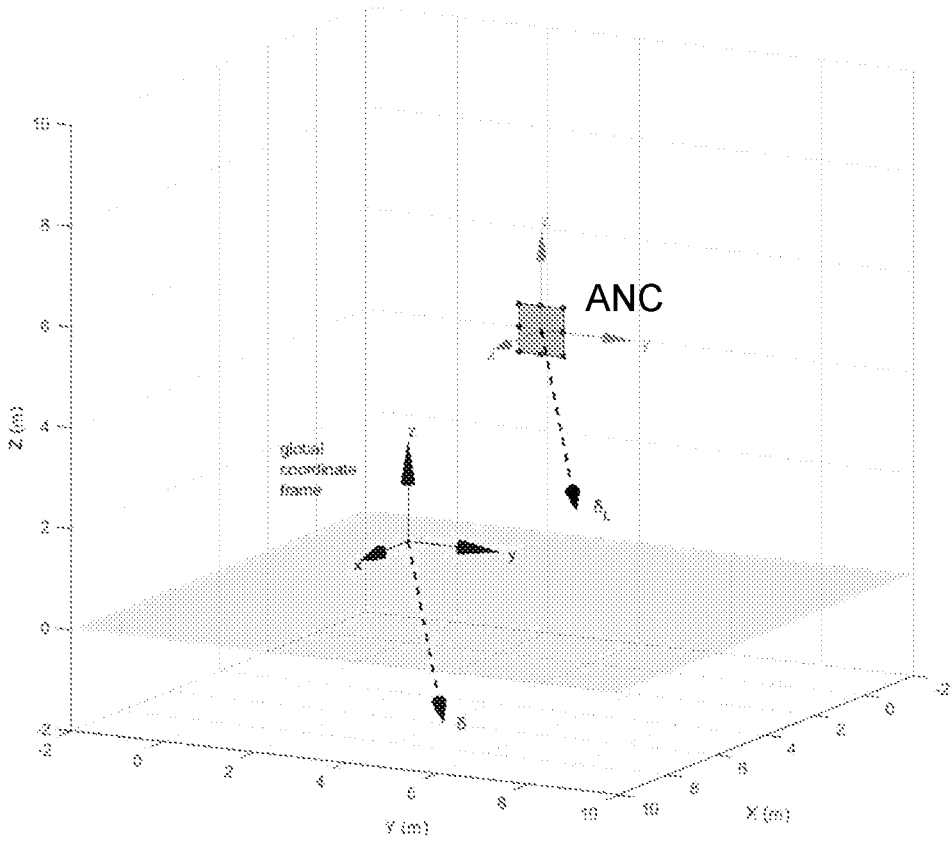
FIGS. 6 to 9 show example 3D views of an anchor point with different rotated orientations in a global coordinate system.

If we consider a vector $$\vec{\delta}_L = \begin{bmatrix} x_0 \\ y_0 \\ z_0 \end{bmatrix}$$

with respect to the local coordinate system and then we construct the vector $$\vec{\delta} = \begin{bmatrix} x_0 \\ y_0 \\ z_0 \end{bmatrix}$$

with respect to the global coordinate system, these two vectors will be parallel as can be seen in FIG. 6.

So, in the case where the anchor point's local coordinate system stems from the global coordinate system by a parallel movement of the axes, there is no need for coordinate translation if we care for the direction of the vectors only.

In such case, the corresponding rotation matrix will be the 3×3 identity matrix $I_3$.

In general, the anchor point's local coordinate system can have any arbitrary orientation in the space, with respect to the global one and the above property is not valid. We can analyze this orientation in a finite sequence of successive rotations around one axis each time and construct easily a resulting rotation matrix.

Rotation Around x-Axis

Figure 7:
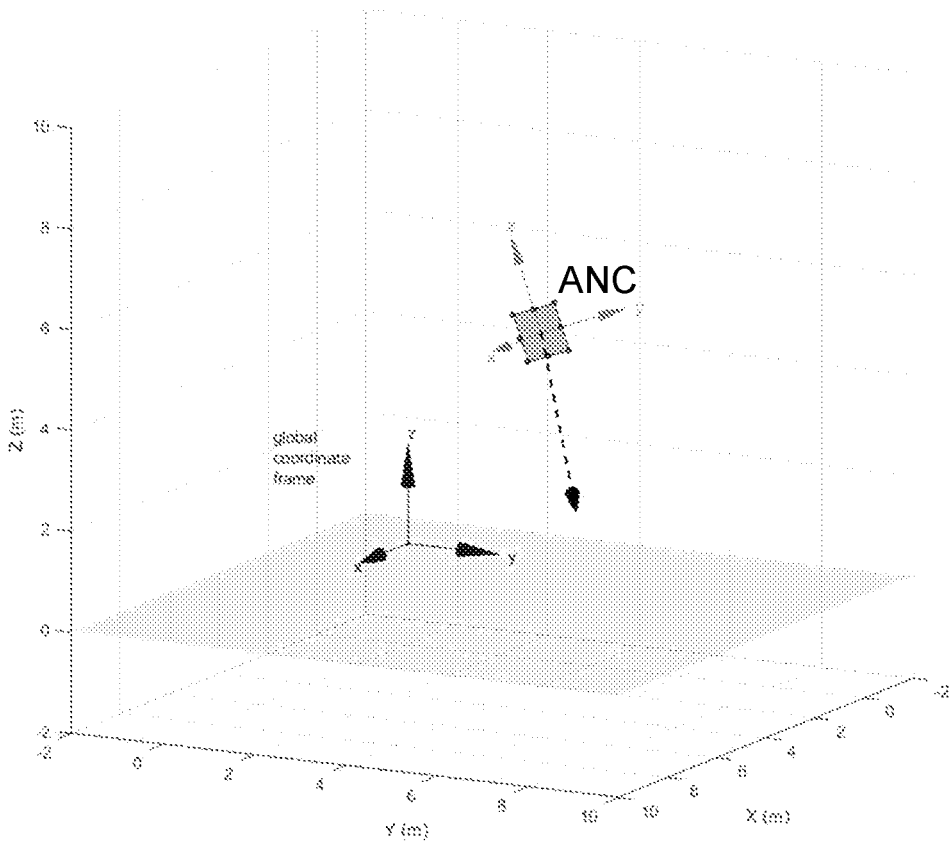

Referring now to FIG. 7, the local coordinate system has been rotated by an angle $\omega_x$ around the axis x. Considering that all coordinate systems are "right-handed", the positive direction of rotation around each axis is given by the "right-hand rule". For example, in FIG. 7 it holds that $\omega_x = +20°$.

The rotation matrix, when we have a rotation around axis x, will be given by the following formula:

$$R_x = \begin{bmatrix} 1 & 0 & 0 \\ 0 & \cos\omega_x & -\sin\omega_x \\ 0 & \sin\omega_x & \cos\omega_x \end{bmatrix} \qquad (11)$$

Rotation Around y-Axis

Figure 8:
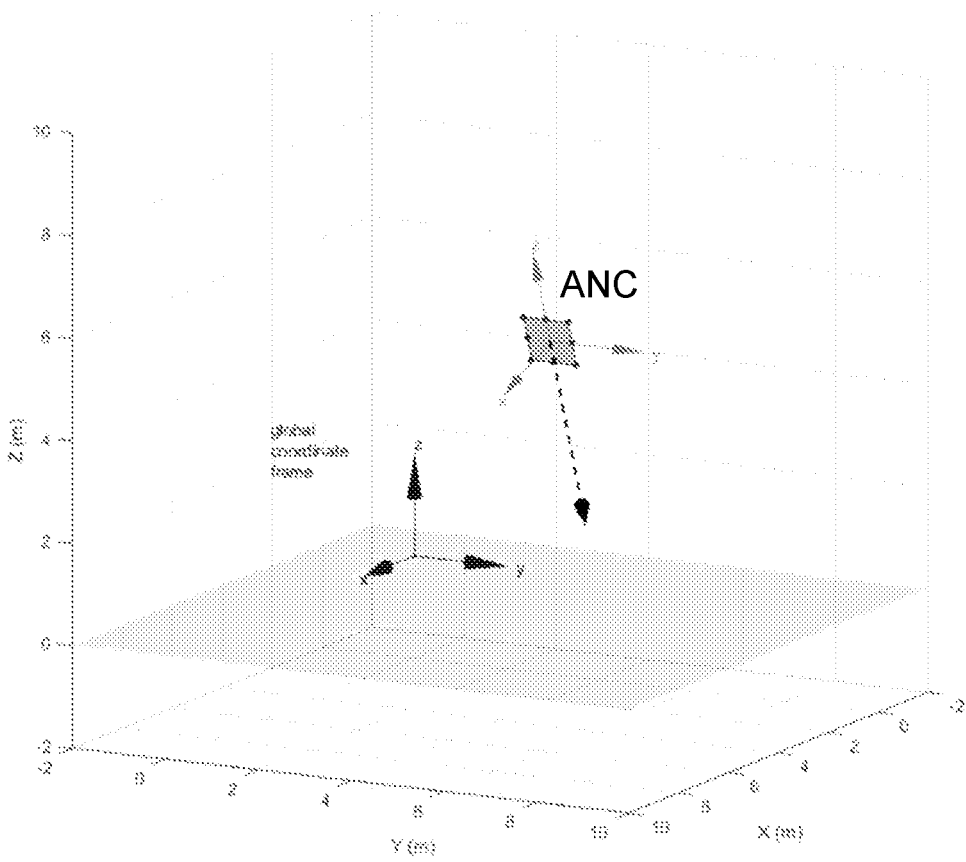

With a similar way we define the rotation matrix when a rotation around axis y has happened. For example, in FIG. 8 the anchor point's square antenna array has been rotated around the y axis by $\omega_y = +20°$ and the same is valid for its local coordinate system.

The rotation matrix around axis y is given by the following formula:

$$R_y = \begin{bmatrix} \cos\omega_y & 0 & \sin\omega_y \\ 0 & 1 & 0 \\ -\sin\omega_y & 0 & \cos\omega_y \end{bmatrix} \qquad (12)$$

Rotation Around z-Axis

Figure 9:
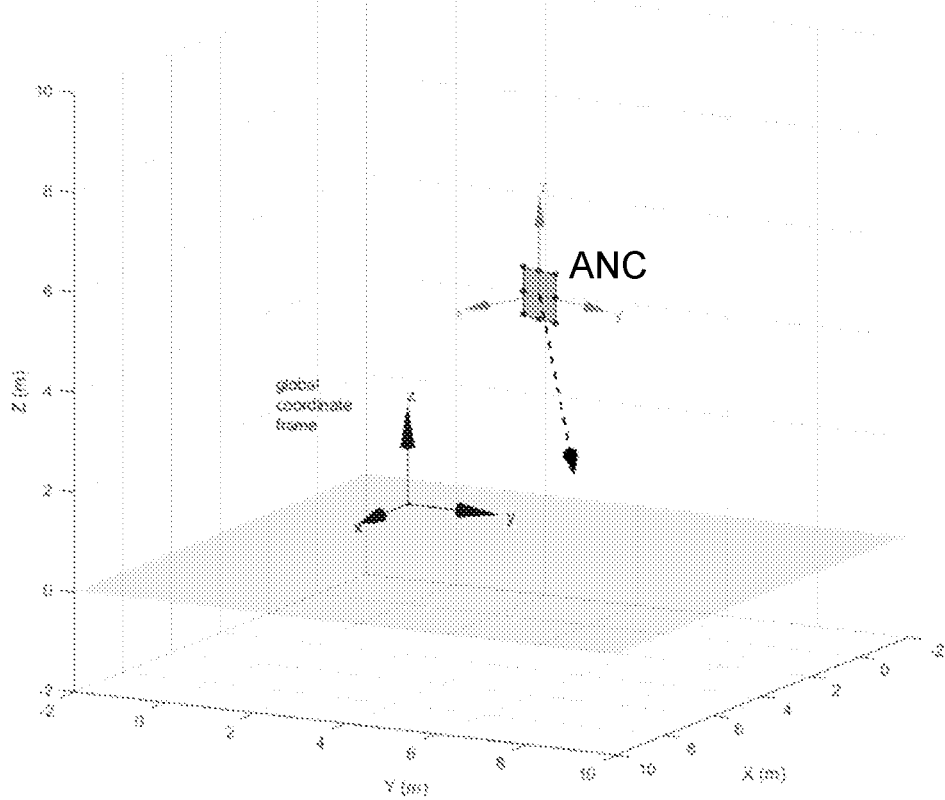

We handle any rotation around axis z with a similar way. In FIG. 9 an example of an anchor that has been rotated by $\omega_z = -20°$ is being depicted. The general form of the corresponding rotation matrix around the z axis is given by the following equation:

$$R_z = \begin{bmatrix} \cos\omega_z & -\sin\omega_z & 0 \\ \sin\omega_z & \cos\omega_z & 0 \\ 0 & 0 & 1 \end{bmatrix} \qquad (13)$$

The three rotation matrices described by equations (11), (12) and (13) are the building blocks that allow us to construct the rotation matrix for any arbitrary orientation of the anchor's local coordinate system. It can be proven that every orientation can be derived by a finite sequence of rotations around the three axes. The aggregated rotation matrix is the product of the corresponding rotation matrices.

Let us examine an example where we apply three rotations. For example, the first rotation is around the y axis by an angle $\omega_y^{(1)}$. The new coordinate system that has been derived, is going to be rotated by its x axis by $\omega_x^{(2)}$. Again, we derive a new coordinate system, which we are rotating around its z axis by $\omega_z^{(3)}$.

The rotation matrix of the final coordinate system is given by the product of the three matrices which describe the three rotation steps:

$$R^{(123)} = R_y^{(1)} \cdot R_x^{(2)} \cdot R_z^{(3)} \qquad (14)$$

$$= \begin{bmatrix} \cos\omega_y^{(1)} & 0 & \sin\omega_y^{(1)} \\ 0 & 1 & 0 \\ -\sin\omega_y^{(1)} & 0 & \cos\omega_y^{(1)} \end{bmatrix} \cdot \begin{bmatrix} 1 & 0 & 0 \\ 0 & \cos\omega_x^{(2)} & -\sin\omega_x^{(2)} \\ 0 & \sin\omega_x^{(2)} & \cos\omega_x^{(2)} \end{bmatrix} \cdot \begin{bmatrix} \cos\omega_z^{(3)} & -\sin\omega_z^{(3)} & 0 \\ \sin\omega_z^{(3)} & \cos\omega_z^{(3)} & 0 \\ 0 & 0 & 1 \end{bmatrix}$$

The number of the rotation steps and the axis that is going to be used at each step are the choice of the designer.

It is evident that any errors in the calculation of the rotation matrix of an anchor will propagate in the positioning engine functionality as described above in conjunction with equations (7), (8) and (9). Errors in the rotation matrix of the anchor point ANC will produce significant errors in the mobile device's TG position estimation, even if the environment is almost multipath-free.

Although measurement of the position of the anchor point ANC can be achieved relatively easy, for the calculation of the rotation matrix with accuracy during the installation, one should be able to measure the exact value of the Euler's angles of the physical orientation of the anchor point as described at the previous section. This is a difficult task which requires expensive equipment that is hard to be handled for the typical user.

Even if we consider that the installation is made by a specialized team, it would be extremely difficult from the typical user to relocate or change the physical orientation of an anchor point that implements AoA/AoD, during the lifetime of the system.

Assuming that the position $T(\hat{x}_T, \hat{y}_T, \hat{z}_T)$ of the mobile device TG has been estimated from the positioning engine, the actual directional vector between the anchor point ANC and the mobile device TG, i.e. the third direction, may be estimated.

With the vector $\vec{AT}$ defined from A and T:

$$\vec{AT} = \begin{bmatrix} \hat{x}_T - x_A \\ \hat{y}_T - y_A \\ \hat{z}_T - z_A \end{bmatrix}$$

The corresponding unit directional vector $\vec{a}$ results in:

$$\vec{a} = \frac{1}{\|\vec{AT}\|}\vec{AT} = \frac{1}{\sqrt{(\hat{x}_T - x_A)^2 + (\hat{y}_T - y_A)^2 + (\hat{z}_T - z_A)^2}} \begin{bmatrix} \hat{x}_T - x_A \\ \hat{y}_T - y_A \\ \hat{z}_T - z_A \end{bmatrix} \quad (15)$$

For the vector $\vec{a}$, we demand it to be equal with the vector $\vec{\delta}$. From the equality $\vec{\delta} = \vec{a}$ and from $\vec{\delta} = R_A \cdot \vec{\delta}_L$ from equation (7), we get the adaptation step for the LMS algorithm that updates the rotation matrix at each new position estimation:

$$R_A^{new} = R_A + \mu(\vec{a} - \vec{\delta})\vec{\delta}_L^H \quad (16)$$

Here $\mu$ is the adaptation gain or convergence factor. Furthermore, the initial value of the rotation matrix is given by the procedure described above and it may be assumed that this initial value is close to the ideal value, e.g. representing the actual orientation of the anchor point. However, the number of iterations just increases for a larger deviation from the ideal value. The ideal value may e.g. determined by a mechanical measurement, which not necessarily is highly accurate. For example, the higher the number of anchor points is in the positioning system, the lower the accuracy of the initial value can be, and vice versa.

Referring back to FIG. 1, the adaptation or adjustment of equation (16) is included in step 106. The method 100 can be performed iteratively by starting over at step 101. Preferably, the mobile device TG is moved between different iteration steps in step 107.

Apparently, the estimation of the position of a mobile device TG by the positioning engine is prone to errors due to multipath, AWGN and other reasons, different from the uncalibrated rotation matrices of one or more anchors, which may distort the angle measurements. This fact leads us to consider that:

For each specific anchor, the produced vector $\vec{\delta}_L$ of equation (5) may contain errors which are propagated to vector $\vec{\delta}$ of equation (7)

Vector $\vec{a}$ in equation (15) may contain an error which is the ensemble of all the errors inside each vector $\vec{\delta}_L$.

The erroneous nature of the vectors $\vec{\delta}_L$, $\vec{\delta}$ and $\vec{a}$, sometimes can force the adaptation algorithm to a false lock situation, especially whenever it operates under severe multipath conditions with more than one anchors to use uncalibrated rotation matrix and the algorithm to try fixing them.

To avoid the problem of false lock, it is proposed to choose a very small value for the adaptation gain $\mu$ in equation (16). The designer should ensure that a large number of mobile targets and/or a large number of positions of each target around the place will be taken into account in the determination of the new value of the rotation matrix of each anchor.

Furthermore, a good strategy is not to use consecutive and close positions of a target for the adaptation. Since a specific target and its estimated position has been used for the adaptation of the rotation matrix (of one or more anchor points), a watching mechanism may prevent the usage of the same target until a time period has been passed and its estimated position is away enough from the previous one. With this method, we ensure that the effect of the multipath on the estimated position $T(\hat{x}_T, \hat{y}_T, \hat{z}_T)$ is uncorrelated with the corresponding previous one. Thus, the errors on vector $\vec{a}$ that have been caused by multipath effects exhibits a zero mean Gaussian behavior.

If the previous two conditions are valid (very slow adaptation and sparse usage of the same target), we can assume that the mean value of the errors caused by reasons other than the uncalibrated rotation matrices, is equal to zero and these errors do not affect the final value of the rotation matrix.

Another good strategy for avoiding false locks of the above adaptation algorithm, as an alternative or on top of what has been described in the previous paragraphs, is to limit the adjustments, e.g. the magnitude of adjustments that we allow the algorithm to alter the initial rotation matrix.

Let us suppose that for an anchor A the initial value of the rotation matrix is $R_A^{ini}$ and after some adaptation steps, we get a new rotation matrix $R_A$. We can define a metric rotdif of the difference of the two matrices in terms of the rotation that they imply:

$$\vec{r}_{ini} = R_A^{ini} \cdot \begin{bmatrix} 1 \\ 1 \\ 1 \end{bmatrix} \quad (17)$$

$$\vec{r} = R_A \cdot \begin{bmatrix} 1 \\ 1 \\ 1 \end{bmatrix}$$

$$rotdif = \frac{\vec{r} \cdot \vec{r}_{ini}}{\|\vec{r}\| \cdot \|\vec{r}_{ini}\|}$$

In the above metric, the nominator is the inner product of the two vectors $\vec{r}_{ini}$ and $\vec{r}$, which are the corresponding translation of the same local vector in the global coordinate system. Namely, the metric rotdif expresses the cosine of the angle among the two vectors in the 3D-space.

The designer can choose a maximum allowable angle $\Omega_{max}$ and discard the outcome of the adaptation step described in equation (16) whenever $rotdif < \cos \Omega_{max}$. The typical range for the values of $\Omega_{max}$ may be between 5° and 15°.

Figure 10:
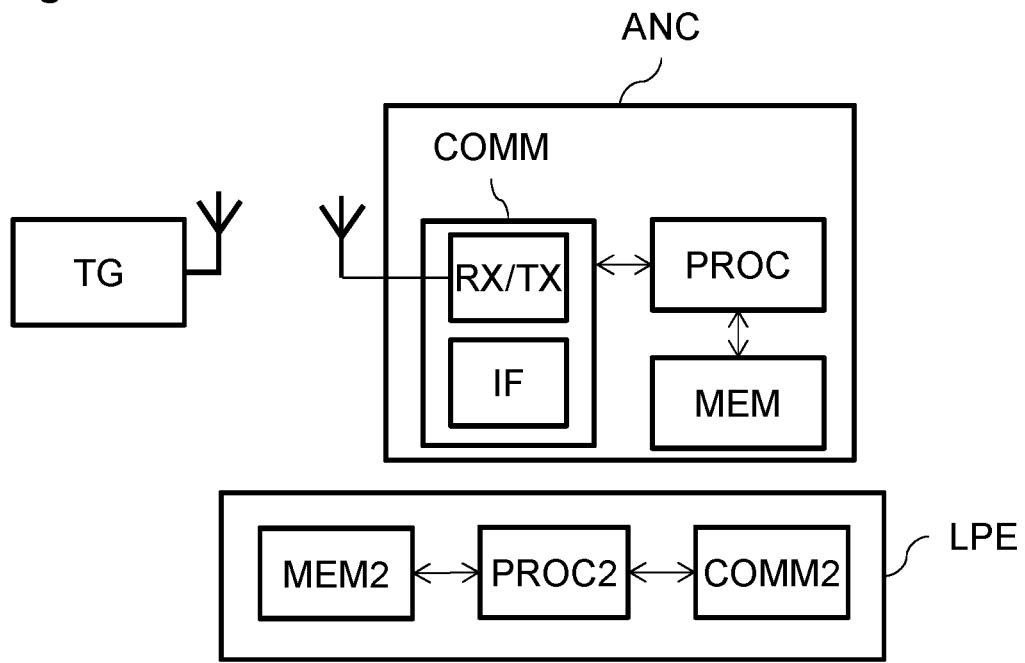
FIGS. 10 and 11 show example positioning systems.
Figure 11:
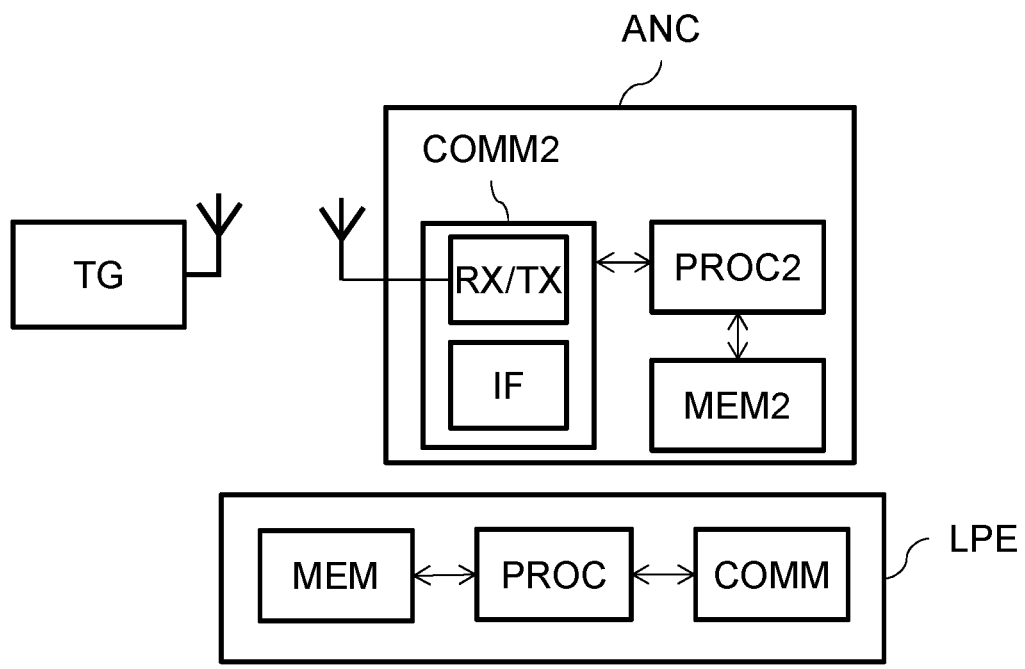

Referring now to FIG. 10 and FIG. 11, example implementations of a calibration system according to the improved calibration concept are shown. In both examples, the system includes an anchor point ANC, a local positioning engine LPE and a mobile device TG. In both examples the anchor point ANC comprises a processing unit PROC, respectively PROC2, a memory MEM, respectively MEM2 and a communication unit COMM, respectively COMM2. In each case the communication unit comprises a receiver RX, a transmitter TX or a transceiver RX/TX which are coupled to an antenna element, and a communication interface IF.

Similarly, the positioning engine LPE also comprises a processing unit PROC2, respectively PROC, a memory MEM2, respectively MEM, and a communication unit COMM2, respectively COMM. The mobile device TG also comprises an antenna element such that the localization signal can be transmitted between the mobile device TG and the anchor point ANC.

The antenna element of the anchor point ANC is an antenna array suitable for AoA, respectively AoD, such that the localization signal is either transmitted from the antenna array to the mobile device TG or vice versa.

The method as described in conjunction with FIG. 1 may be fully performed in the anchor point ANC as shown in FIG. 10. For example, the memory MEM stores the anchor position of the anchor point ANC within the global coordinate system and further stores the anchor orientation of the anchor point. The communication unit COMM receives and/or sends the localization signal from, respectively to, the mobile device TG with the module RX/TX. Furthermore, the communication unit receives or acquires the respective target position of the mobile device TG that is associated with the respective transmitted localization signal. This is, for example, done with the interface IF.

The processing unit determines the first direction $\vec{\delta}_L$, the second direction $\vec{\delta}$ and the third direction $\vec{\alpha}$ in order to adjust the stored anchor orientation.

The target position of the mobile device TG may be received from the positioning engine LPE, which for example determines the target position via equation (10), or from another device that is able to otherwise determine the target position.

The anchor point ANC of FIG. 10 may be operated in a calibration mode of operation, during which the processing unit PROC adjusts the anchor orientation, and in a normal mode of operation, during which only the first and the second direction are determined, such that the second direction can be provided to the positioning engine LPE for regular position determination of the mobile device TG.

Referring to the example of FIG. 11, the anchor point ANC may not perform all of the method steps itself, but may merely serve to determine the first direction based on the localization signal transmitted between the mobile device TG and the anchor point ANC. Accordingly, the anchor point may provide the first direction to the positioning engine LPE, which performs determination of the second and third direction and the adjustment of the anchor orientation.

In a further example implementation based on the structure of FIG. 11, the anchor point may also perform the determination of the second direction, while the determination of the third direction and the adjustment of the anchor orientation is performed on the processing unit PROC of the positioning engine LPE. In the latter case, the adjusted anchor orientation is not only stored in the memory MEM of the positioning engine LPE, but also transmitted and stored in the anchor point ANC.

In the case of AoD, with the structure of FIG. 11, the mobile device TG may determine at least the first direction, which is provided to the positioning engine LPE for further processing. In this case the anchor point ANC only transmits the localization signal via its antenna array.

Figure 12:
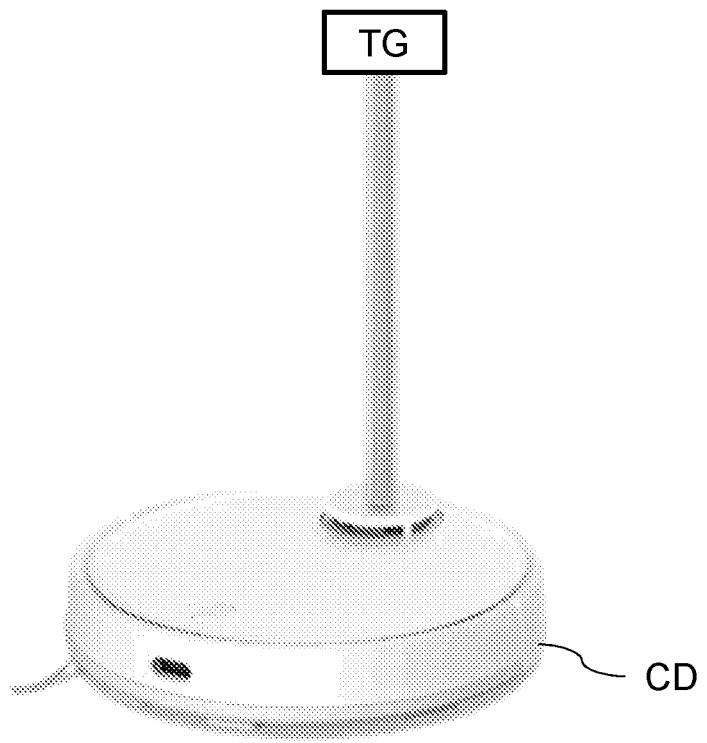
FIG. 12 shows an example of a carrier device with a mobile device.

Referring now to FIG. 12, a movable carrier device CD is shown with a mobile device TG mounted to the carrier device, e.g. mounted to a pole fixed to the carrier device CD. Such a carrier device CD with the mobile device TG attached may be a further part of a calibration system as described in conjunction with FIG. 10 and FIG. 11. For example, the carrier device CD uses other sensors for position determination and is able to provide its ground truth position. For example, the carrier device is a robotic mechanism or a robotic autonomous vehicle being able to move around in the area of the positioning system in a controlled and/or autonomous fashion.

With the ability of the carrier device to determine its ground truth position, in particular employing a localization performed without employing the anchor point ANC to be calibrated, the ground truth position of the mobile device TG attached to the carrier device CD can be easily derived as well. Hence, said ground truth position of the mobile device TG can be used as the target position and provided to the respective entity that performs the determination of the third direction, e.g. the anchor point ANC or the positioning engine LPE.

It is conceivable that the carrier device communicates only with the positioning engine LPE, and the positioning engine LPE distributes the target position for further processing. Hence, instead of using the estimated position of the mobile device TG, as e.g. determined with equation (10) as the target position, the ground truth position determined via the carrier device CD is used as the target position. It should be apparent to the skilled reader that the remaining process remains the same, as only the source of the target position is changed in such an implementation.

Usage of the ground truth position determined via the carrier device CD may prevent a situation of a possible false lock. Furthermore, the adjustment of the anchor orientation may converge faster. In some implementations, e.g. in a common mode of operation, the improved calibration concept may use the carrier device and its ground truth position and at the same time may use the estimated positions of other common mobile devices as described earlier. The adaptation gain p as used in equation (16) may be chosen significantly larger if the ground truth position from the carrier CD is available.

Various embodiments of the improved calibration concept can be implemented in the form of logic in software or hardware or a combination of both. The logic may be stored in a computer readable or machine-readable storage medium as a set of instructions adapted to direct one or more processors of a (distributed) computer system to perform a set of steps disclosed in embodiments of the improved calibration concept. The logic may form part of a computer program product adapted to direct an information-processing device to automatically perform a set of steps disclosed in embodiments of the improved calibration concept.

The specification and drawings are, accordingly, to be regarded in an illustrative rather than a restrictive sense. However, it will be evident that various modifications and changes may be made thereunto without departing from the scope of the invention as set forth in the claims.

LIST OF REFERENCE SIGNS 100 method for calibrating an anchor point
101-107 steps
ANC, ANC2, ANC3 anchor points
TG mobile device
LPE positioning engine
PROC, PROC2 processing unit
MEM, MEM2 memory
COMM, COMM2 communication unit
RX receiver
TX transmitter
IF interface
CD carrier device

The invention claimed is:

1. A method for calibrating an anchor point in a positioning system, the method comprising:
   transmitting a localization signal between a mobile device and the anchor point;
   determining a first direction between the mobile device and the anchor point in a local coordinate system based on the transmitted localization signal;
   determining a second direction between the mobile device and the anchor point in a global coordinate system based on the determined first direction and a stored anchor orientation of the anchor point, the anchor orientation defining the local coordinate system of the anchor point with respect to the global coordinate system;
   acquiring a target position of the mobile device, the target position being associated with the transmitted localization signal;
   determining a third direction between the mobile device and the anchor point in the global coordinate system based on a known anchor position and the target position; and
   adjusting the stored anchor orientation based on the first direction and a difference between the second and the third direction.

2. The method according to claim 1, wherein transmission of the localization signal and acquisition of the associated target position is performed iteratively and the anchor orientation is adjusted based thereon respectively.

3. The method according to claim 2, wherein the mobile device is moved between iterated receptions of the respective associated target positions.

4. The method according to claim 1, wherein the anchor orientation is based on an orientation of an antenna array of the anchor point with respect to the global coordinate system.

5. The method according to claim 1, wherein the mobile device is mounted to a moveable carrier device, and wherein the carrier device determines a position of the mobile device within the global coordinate system and provides the determined position as the target position.

6. The method according to claim 1, wherein the target position is determined employing at least two further anchor points by transmitting the localization signal and/or respective further localization signals between the mobile device and the at least two further anchor points.

7. A device for a positioning system, the device comprising:
   a memory configured:
      to store a known anchor position of an anchor point for the positioning system within a global coordinate system; and
      to store an anchor orientation of the anchor point, the anchor orientation defining a local coordinate system of the anchor point with respect to the global coordinate system;
   a communication unit that is configured:
      to receive a localization information that is based on a localization signal transmitted between a mobile device and the anchor point; and
      to acquire a target position of the mobile device, the target position being associated with the transmitted localization signal; and
   a processing unit that is configured
      to acquire a first direction between the mobile device and the anchor point in the local coordinate system based on the received localization information;
      to acquire a second direction between the mobile device and the anchor point in the global coordinate system based on the determined first direction and the anchor orientation;
      to determine a third direction between the mobile device and the anchor point in the global coordinate system based on the anchor position and the target position; and
      to adjust the stored anchor orientation based on the first direction and a difference between the second and the third direction.

8. The device according to claim 7, wherein the processing unit is configured to adjust the stored anchor orientation with a steepest decent algorithm.

9. The device according to claim 8, wherein the steepest decent algorithm is a Least Mean Squares algorithm employing a convergence factor.

10. The device according to claim 7, which is configured to iteratively receive the localization information and to acquire the target position and to adjust the anchor orientation based thereon.

11. The device according to claim 7, which is configured to be operated in a calibration mode of operation, during which the processing unit adjusts the anchor orientation, and in a normal mode of operation, during which the communication unit receives the localization information and the processing unit determines the first and the second direction.

12. The device according to claim 7, wherein the device is the anchor point; and
   the localization information is one of:
   the localization signal received from the mobile device; or
   a direction information determined by the mobile device based on the localization signal received from the anchor point.

13. The device according to claim 7, wherein the device is a positioning engine; and
   the localization information is a direction information determined by the mobile device or by the anchor point based on the localization signal transmitted between the mobile device and the anchor point.

14. A calibration system for a positioning system within a global coordinate system, the calibration system comprising a moveable carrier device, a mobile device mounted to the carrier device, and a further device as an anchor point, the further device comprising:
   a memory configured:
      to store a known anchor position of the anchor point; and
      to store an anchor orientation of the anchor point, the anchor orientation defining a local coordinate system of the anchor point with respect to the global coordinate system;

a communication unit configured:
  to receive a localization information that is based on a localization signal transmitted between a mobile device and the anchor point; and
  to acquire a target position of the mobile device, the target position being associated with the transmitted localization signal; and
a processing unit configured
  to acquire a first direction between the mobile device and the anchor point in the local coordinate system based on the received localization information;
  to acquire a second direction between the mobile device and the anchor point in the global coordinate system based on the determined first direction and the anchor orientation;
  to determine a third direction between the mobile device and the anchor point in the global coordinate system based on the anchor position and the target position;
  to adjust the stored anchor orientation based on the first direction and a difference between the second and the third direction, and
wherein:
the carrier device is configured to determine a position of the mobile device within the global coordinate system and to provide the determined position to the further device as the target position; and
the localization information is one of:
  the localization signal received from the mobile device; or
  a direction information determined by the mobile device based on the localization signal received from the anchor point.

15. One or more tangible, non-transitory, computer-readable media storing instructions that, when executed by one or more processors, cause the one or more processors to perform operations comprising:
  transmitting a localization signal between a mobile device and an anchor point in a positioning system;
  determining a first direction between the mobile device and the anchor point in a local coordinate system based on the transmitted localization signal;
  determining a second direction between the mobile device and the anchor point in a global coordinate system based on the determined first direction and a stored anchor orientation of the anchor point, the anchor orientation defining the local coordinate system of the anchor point with respect to the global coordinate system;
  acquiring a target position of the mobile device, the target position being associated with the transmitted localization signal;
  determining a third direction between the mobile device and the anchor point in the global coordinate system based on a known anchor position and the target position; and adjusting the stored anchor orientation based on the first direction and a difference between the second and the third direction.

16. A calibration system for a positioning system within a global coordinate system, the calibration system comprising a moveable carrier device, a mobile device mounted to the carrier device, an anchor point, and a positioning engine that comprises:
  a memory configured:
    to store a known anchor position of the anchor point; and
    to store an anchor orientation of the anchor point, the anchor orientation defining a local coordinate system of the anchor point with respect to the global coordinate system;
  a communication unit configured:
    to receive a localization information that is based on a localization signal transmitted between a mobile device and the anchor point; and
    to acquire a target position of the mobile device, the target position being associated with the transmitted localization signal; and
  a processing unit configured
    to acquire a first direction between the mobile device and the anchor point in the local coordinate system based on the received localization information;
    to acquire a second direction between the mobile device and the anchor point in the global coordinate system based on the determined first direction and the anchor orientation;
    to determine a third direction between the mobile device and the anchor point in the global coordinate system based on the anchor position and the target position;
    to adjust the stored anchor orientation based on the first direction and a difference between the second and the third direction, and
  wherein:
  the carrier device is configured to determine a position of the mobile device within the global coordinate system and to provide the determined position to the positioning engine as the target position; and
  the localization information is a direction information determined by the mobile device or by the anchor point based on the localization signal transmitted between the mobile device and the anchor point.

* * * * *